2,905,678
6β-HYDROXY-Δ⁴-PREGNENES

Lewis H. Sarett, Princeton, James Constantin, Linden, and Glen E. Arth, Cranford, N.J., assignors to Merck & Co., Inc., Rahway, N.J., a corporation of New Jersey No Drawing. Application November 16, 1953
Serial No. 392,515
44 Claims. (Cl. 260—397.45)

This invention relates to steroid compounds. More particularly, this invention is concerned with the production of novel active pregnene compounds which are characterized by the presence of a hydroxy substituent in the 6 position.

The discovery of efficacious uses to which steroids such as cortisone and hydrocortisone may be put has stimulated interest in the steroid field in many directions. One of the chief pursuits, however, has been in the search for new steroid compounds which possess cortisone-like activity and which lack the undesirable side effects ordinarily caused by such compounds. Steroid compounds having such activity but which are substantially free of untoward effects would be of immense value in the treatment of diseases associated with a deficiency of cortisone-like compounds and also in the treatment of other afflictions such as various types of allergies and dermatitis. Unfortunately, none of the many steroid compounds produced heretofore have been found to possess the requisite activity in the absence of the disadvantages normally associated with the use of such compounds.

An object of the present invention therefore is to provide novel steroid compounds which have cortisone-like activity. A further object is to provide steroid compounds which lack many of the undesirable side effects that ordinarily develop after prolonged administration of the known steroids having cortisone-like activity. Another object is to provide novel processes of producing these active steroid compounds together with novel intermediate steroids useful in such processes.

According to the present invention these and other objects which will appear from the following description of the invention have been attained by the discovery of novel 6-hydroxy-Δ⁴-pregnenes of the formula

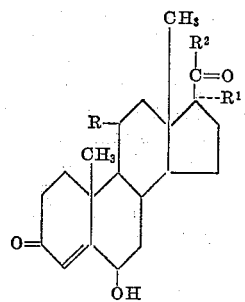

wherein R is a keto or hydroxy group, R¹ is hydrogen or the hydroxy group and acylates thereof and R² is methyl or a functional group containing oxygen such as the methylol group and acylates thereof, at least one of the groups in the 17 and 21 positions being an oxygen containing substituent. Such compounds have cortisone-like activity but do not cause adverse side effects usually associated with such activity.

These novel 6-hydroxy Δ⁴-pregnenes are produced by the application of a novel sequence of chemical reactions. In the first phase of this process 3,11,20-triketo-Δ⁴-pregnenes having an α-hydrogen or α-hydroxy group in the 17 position and a methyl or esterified methylol group in the 21-position, at least one of the 17 and 21 groups containing oxygen, are first subjected to novel methods suitable for introducing the 6-hydroxy groups. The second phase of the process comprises reduction of the 11-keto-substituent of the resulting 6-hydroxy Δ⁴-pregnenes to obtain the corresponding 11-hydroxy compounds.

Production of the novel 6β-hydroxy-3,11,20-triketo-Δ⁴-pregnenes having an α-hydrogen or an α-hydroxy group in the 17 position and a methyl group or a methylol group in the 21 position, at least one group in the 17 and 21 positions containing oxygen, can be achieved according to several different but related procedures. A preferred procedure of producing these novel compounds comprises converting a Δ⁵-pregnene-11,20-dione compound having a substituent in the 3 position which is hydrolyzable to a 3-keto group, an α-hydrogen or α-hydroxy group in the 17 position and a methyl or esterified methylol group in the 21 position (I) to the corresponding 5,6-epoxy-pregnane (II), reacting said 5,6-epoxypregnane with formic acid at ordinary temperatures to form the corresponding 5α-hydroxy-6-formoxy pregnane having a free 3-keto group (III), heating said 5α-hydroxy-6β-formoxy pregnane in the presence of formic acid to remove the 5α-hydroxy substituent and give the corresponding 6β-formoxy-Δ⁴-pregnene (IV), and treating said 6-formoxy-Δ⁴-pregnene with a weak base under suitable conditions to produce the corresponding 6β-hydroxy-Δ⁴-pregnene compounds having either a methyl, methylol or esterified methylol group in the 21 position and if desired, further hydrolyzing the resulting 6β-hydroxy-Δ⁴-pregnene compounds having an ester group in the 21 position to the corresponding 21-methylol compounds (VI). This process may be represented as follows:

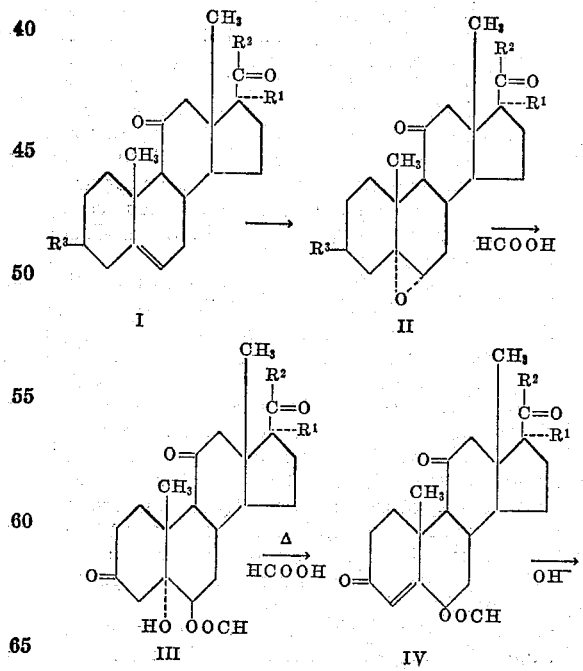

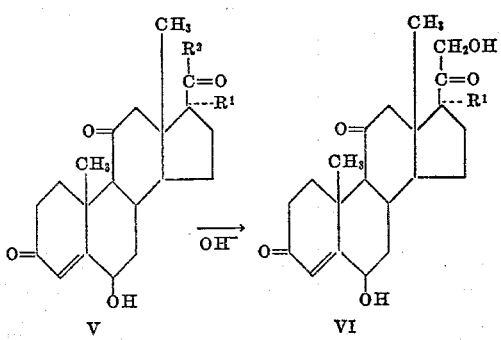

[When R² is a methylol ester]

wherein R¹ is hydrogen or hydroxy, R² is methyl or an esterified methylol group and R³ is a substituent which can be hydrolyzed to a 3-keto group.

The first reaction in this process in which a Δ⁵-pregnene is converted to the corresponding 5,6-epoxypregnane is achieved by treating the Δ⁵-pregnene with a suitable oxidizing agent such as an organic per acid. Examples of organic per acids which are useful for this purpose are performic acid, peracetic acid, perbenzoic acid and monoperphthalic acid and the like. This reaction is conveniently effected by contacting the Δ⁵-pregnene and oxidizing agent in the presence of an inert organic solvent or mixture of solvents such as benzene, chloroform, ethyl acetate and dimethylformamide. The reaction proceeds at ordinary temperatures and is completed in a short time. Usually, however, it is found desirable to let the mixture stand for several hours or more to attain optimum yields. The desired 5,6-epoxy-pregnane produced in this manner can be recovered from the reaction mixture by conventional methods. Thus, the mixture may be cooled, the precipitate filtered, washed with ether and dried. The described reaction can be readily achieved using as the starting materials any 11,20-diketo-Δ⁵-pregnene having a 17α-hydrogen or 17α-hydroxy substituent, a 21-methyl, methylol or ester thereof, at least one of the 17 and 21 groups containing oxygen, and a substituent in the 3 position which is convertible to a 3-keto group by hydrolysis such as a cyclic ketal. It is generally preferred to employ Δ⁵-pregnenes in this reaction in which the 3 substituent is a cyclic ketal derived from ethylene glycol or propylene glycol. Specific examples of starting materials which can be used in this process that might be mentioned are 3-ethylenedioxy-17α,21-dihydroxy-11,20-diketo-Δ⁵-pregnene-21-acetate and other 21-esters thereof such as the propionate, butyrate, benzoate, tricarballylate, hemisuccinate, t-butyl acetate and the like; 3-ethylenedioxy - 21 - hydroxy-11,20-diketo-Δ⁵-pregnene-21-acetate, and other esters thereof as listed above; 3-ethylenedioxy-17α-hydroxy-11,20-diketo-Δ⁵-pregnene; and similar Δ⁵-pregnenes in which the 3-ethylenedioxy group has been replaced by different groups such as a propylenedioxy group. Such compounds may be prepared by methods disclosed in the art, such as in the J. Am. Chem. Soc. 75, 1716 (1952).

According to a specific illustration of this reaction 3-ethylenedioxy-17α, 21 - dihydroxy-11,20-diketo-Δ⁵-pregnene-21-acetate is reacted with monoperphthalic acid in an inert solvent to produce 3-ethylenedioxy-17α,21-dihydroxy-11,20-diketo-5,6-epoxypregnane-21-acetate. Representative of other novel steriods which are produced according to the described procedures from the appropriate starting materials are 3-ethylenedioxy-21-hydroxy-11,20-diketo-5,6-epoxypregnane-21-acetate and other esters such as the propionate, benzoate, tricarballylate and the like of these and similar compounds, 3-ethylenedioxy-17α-hydroxy-11,20-diketo-5,6-epoxypregnane, and related compounds having different substituents in the 3 position such as previously indicated.

The second step in this procedure comprises converting the 5,6-epoxypregnanes produced by the previous reaction to the corresponding 5-α-hydroxy-6β-formoxy compounds. This can be accomplished by contacting the 5,6-epoxypregnanes with formic acid, preferably concentrated formic acid, at ordinary temperatures such as room temperature. Treatment for formic acid at room temperature results in cleavage of the 5,6-epoxide structure to a 5α-hydroxy-6β-formoxy and simultaneously effects formation of a 3-keto group by hydrolysis of the protecting group. The desired reaction is completed quickly, usually in a matter of 1 to 10 minutes, and to prevent further reaction at this stage the mixture is diluted with water and the product extracted with a substantially immiscible organic solvent such as ethyl acetate or chloroform. After washing the extract with water the product is isolated by removal of the solvent under reduced pressure. The purity may be increased further by recrystallization of the material from ethanol or acetone-petroleum ether as desired.

This second step may be conveniently illustrated by the reaction of 3-ethylenedioxy-17α, 21-dihydroxy-11,20-diketo-5,6-epoxypregnane-21-acetate with formic acid to form 5α, 6β, 17α, 21-tetrahydroxy-3,11,20-triketo-pregnane-6-formate-21-acetate. Examples of other similar compounds that are produced according to this method are 5α, 6β, 21-trihydroxy-3,11,20-triketo-pregnane-6-formate-21-acetate, 5α, 6β, 17α-trihydroxy-3,11,20-triketo-pregnane-6-formate and other 21-esters thereof as described hereinabove.

In the third step of this procedure the 5α-hydroxy-6β-formoxy pregnanes obtained from the previous reaction are contacted with formic acid at an elevated temperature to remove the 5α-hydroxy substituent and produce the corresponding Δ⁴-pregnenes. This is conveniently achieved by the use of concentrated formic acid and elevated temperatures up to about 100° C., preferably the steam bath temperature. The reaction is ordinarily completed under these conditions in one-quarter to two hours. Isolation of the resulting 6β-formoxy-Δ⁴-pregnenes is readily accomplished by extraction with chloroform and evaporation of the solvent. Examples of novel compounds which are produced in this way from the corresponding 5α-hydroxy-6β-formoxy pregnanes formed above are 6β, 17α, 21-trihydroxy-3,11,20-triketo-Δ⁴-pregnene-6-formate-21-acetate and other esters such as the benzoate and tricarballylate, 6β, 21-dihydroxy-3,11,20-triketo-Δ⁴-pregnene-6-formate-21-acetate and other esters thereof and 6β, 17α-dihydroxy-3,11,20-triketo-Δ⁴-pregnene-6-formate.

According to the fourth step of this procedure the Δ⁴-pregnene-6-formoxy compounds from the prior step are selectively hydrolyzed to the corresponding 6-hydroxy compounds. This selective hydrolysis is conveniently effected by subjecting the Δ⁴-pregnene-6-formoxy compound to the action of a suitable base such as an alkali metal hydroxide, carbonate or bicarbonate. Preferably, this reaction is conducted in a mixture of water and a suitable organic solvent such as methanol or ethanol to promote solution of the Δ⁴-pregnenes. To achieve selective hydrolysis of the 6-formate without simultaneously hydrolyzing esters in the 21 position the reaction time is limited to about 15 minutes and relatively dilute solutions of the bases are employed. After about 15 minutes was is added to the mixture, the product is extracted with chloroform and isolated by evaporation of the solvents. In this manner there are produced 6β, 17α, 21-trihydroxy-3,11,20-triketo-Δ⁴-pregnene-21-acetate and similar 21-esters as described above, 6β, 21-dihydroxy-3,11,20-triketo-Δ⁴-pregnene-21-acetate and other esters thereof and 6β, 17α-dihydroxy-3,11,20-triketo-Δ⁴-pregnene.

The 21-esters of the 6β,21-dihydroxy-3,11,20-triketo-Δ⁴-pregnenes having an α-hydrogen or an α-hydroxy group in the 17 position that are produced in the preceding reaction are readily converted to the corresponding 21-hydroxy compounds by hydrolysis. This hydrolysis can be conveniently achieved by contacting the ester with a suitable base. Bases such as sodium hydroxide, potassium carbonate and sodium bicarbonate are useful for this purpose. Solvents such as methanol and ethanol are usually used in conjunction with water to effect solution of the reactants. The reaction is readily effected at room temperature although slightly elevated temperatures may also be employed. At room temperature the hydrolysis is completed in about 2–4 hours and in lesser times at increased temperatures. After the hydrolysis has been completed the product can be recovered by the usual methods. Examples of compounds that are produced in this manner from 21-esters such as the acetate, propionate, benzoate, hemisuccinate, t-butyl acetate and tricarballylate of the appropriate precursors are 6β,17α, 21-trihydroxy-3,11,20-triketo-Δ⁴-pregnene (6-hydroxy cortisone) and 6β,21-dihydroxy-3,11,20-triketo-Δ⁴-pregnene.

According to an alternative method 6β,17α,21-trihydroxy-3,11,20-triketo-Δ⁴-pregnene and 6β,21-dihydroxy-3,11,20-triketo-Δ⁴-pregnene are produced from the 6β,21-dihydroxy-3,11,20-triketo-Δ⁴-pregnene-6-formate-21-esters having an α-hydrogen or α-hydroxy in the 17 position by a direct, one step hydrolysis rather than the two step hydrolysis already described (this one step process is presently preferred however to obtain highest yields of the desired products). This simultaneous hydrolysis of the 6-formoxy and 21-ester groups is conveniently achieved by subjecting the starting materials to the action of a suitable base until the combined hydrolysis is completed. This reaction can be represented as follows:

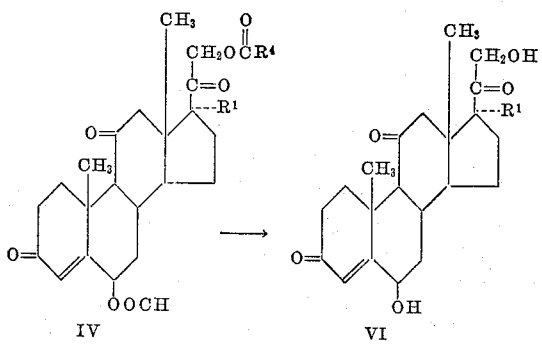

wherein $R^1$ is hydrogen or hydroxy and $R^4$ is an alkyl, aryl or aralkyl radical such as methyl, ethyl, propyl, phenyl, t-butyl methylene and the like.

This combined hydrolysis is conveniently achieved by contacting the di-ester and base under solvent conditions such as in aqueous methanol or ethanol. Bases such as alkali metal hydroxides, carbonates and bicarbonates are particularly useful in effecting the hydrolysis, and specifically sodium hydroxide or sodium bicarbonate may be used. The reaction proceeds at room temperature and goes to completion in about 1 to 5 hours, depending to some extent on the concentration of the base and the nature of the specific base employed. Ordinarily, greater concentrations of the bases are used in this dual hydrolysis than are used in the selective hydrolysis procedure described above. Although the hydrolysis need not be performed under an inert atmosphere such a procedure is often employed to guard against undesired side reactions which may occur. Following completion of the reaction the product can be isolated by conventional techniques.

According to another alternative route which can be used in the production of these novel compounds the 21-hydroxy-11,20-diketo-5,6-epoxypregnanes having a group in the 3-position that is convertible to keto by hydrolysis, an α-hydrogen or an α-hydroxy group in the 17-position and a methyl or an esterified methylol group in the 21-position, at least one of the groups in the 17 and 21 positions containing oxygen (II), which have been previously described, can be converted in one step to the corresponding 6β-formoxy derivatives. This can be conveniently accomplished by treating the starting materials with formic acid at an elevated temperature. The reaction may be represented as follows:

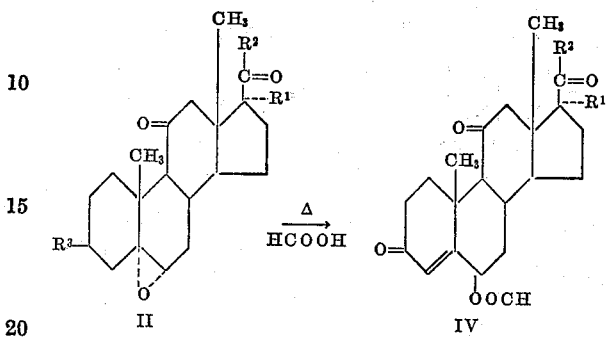

wherein $R^1$ is hydrogen or hydroxy, $R^2$ is methyl or an esterified methylol group and $R^3$ is a group convertible to keto by hydrolysis.

In a specific illustration of this reaction 3-ethylenedioxy-17α, 21-dihydroxy-11,20-diketo-5,6-epoxypregnane-21-acetate is contacted with formic acid, the mixture is heated on the steam bath for about an hour to produce 6β, 17α,21-trihydroxy-3,11,20-triketo-Δ⁴-pregnene-6-formate-21-acetate. The product is readily recovered from the reaction mixture by adding water to the mixture and extracting with chloroform which can be evaporated to isolate the product. Products other than the 21-acetate such as the propionate, butyrate, t-butyl acetate, benzoate and hemisuccinate are also produced by employing the appropriate 21-ester as the starting material. Other compounds such as 6β,21-dihydroxy-3,11,20-triketo-Δ⁴-pregnene-6-formate-21-acetate and 6β,17α-dihydroxy-3,11,20-triketo-Δ⁴-pregnene-6-formate are also produced from the corresponding 5,6-epoxides by this method.

Another embodiment of the present invention by which the novel 6β-hydroxy-3,11,20-triketo-Δ⁴-pregnenes having an α-hydrogen or α-hydroxy group in the 17 position and a methyl or methylol group in the 21 position at least one of the substituents in the 17 and 21 positions being an oxygen containing radical (VI) can be produced comprises converting an 11,20-diketo-5,6-epoxypregnane having a substituent in the 3 position that can be hydrolyzed to a 3-keto group, an α-hydrogen or α-hydroxy in the 17-position, and a methyl or esterified methylol group in the 21 position (II) to the corresponding 5α,6β-dihydroxy-3-keto-pregnane (VII), selectively treating the said 5α,6β-dihydroxy pregnane with an acetylating agent to produce the corresponding 5α-hydroxy-6β-acetoxy pregnane (VIII), dehydrating said compound such as with acetic anhydride to produce the corresponding 6-acetate-Δ⁴-pregnene and simultaneously acetylating the 17α-hydroxy group, if present (IX), and subsequently deesterifying said compounds to the desired free hydroxy compounds (VI). This process may be represented as follows:

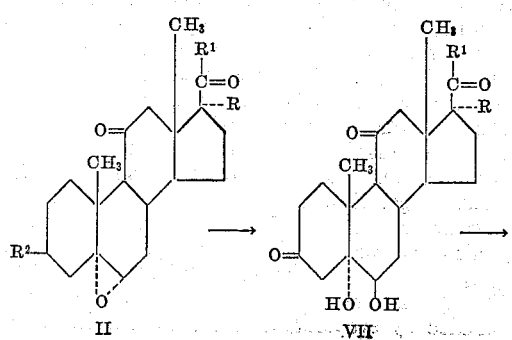

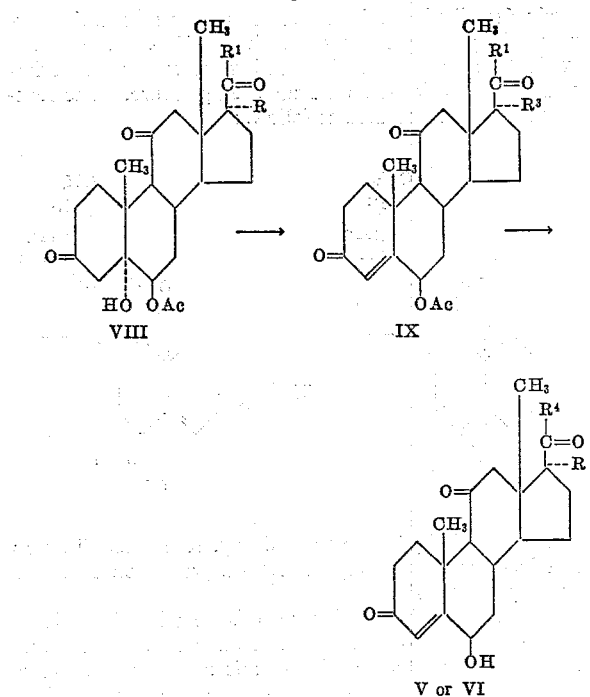

wherein R is hydrogen or hydroxy, R¹ is methyl or an esterified methylol group, R² is a group convertible to keto by hydrolysis, R³ is hydrogen or acetate and R⁴ is methyl or methylol, at least one of the substituents in the 17 and 21 positions being an oxygen containing group.

In the first reaction, the 5,6-epoxypregnanes can be conveniently hydrolyzed to the corresponding 5α,6β-dihydroxy-3-keto-pregnanes by the use of a suitable acid such as hydrochloric acid or sulfuric acid. This reaction is readily effected by contacting the 5,6-epoxypregnane and acid in a suitable water miscible solvent such as acetone or a lower alcohol in the presence of water. Ordinarily very dilute concentrations of acid are sufficient to achieve the hydrolysis. This hydrolysis may be effected at room temperature or at elevated temperatures such as the reflux temperature in about 15 minutes to 2 hours. The resulting product can be recovered from the reaction mixture by neutralizing the mixture with pyridine, removing the solvents and extracting the product from the residue with ethyl acetate. In a specific illustration of this procedure 3-ethylenedioxy-17α,21-dihydroxy-11,20-diketo-5,6-epoxypregnane-21-acetate is hydrolyzed with sulfuric acid to give 5α,6β,17α,21-tetrahydroxy-3,11,20-triketo-pregnane-21-acetate. In a like manner 5α,6β,21-trihydroxy-3,11,20-triketo-pregnane-21-acetate, 5α,6β,17α-trihydroxy-3,11,20-triketo-pregnane are produced from the corresponding 5,6-epoxypregnanes, it being understood of course that groups other than ethylenedioxy which can be converted to keto groups by hydrolysis may be present in the 3 position.

In the second reaction the 5α,6β-dihydroxy pregnanes produced in the previous reaction are converted to the corresponding 5α-hydroxy-6β-acetoxy pregnanes by treatment with a suitable acetate supplying reactant, preferably acetic anhydride. This reaction can be achieved by contacting the 5α,6β-dihydroxy pregnanes with an acetylating agent such as acetic anhydride under solvent conditions. An excess of acetic anhydride may be employed as the solvent alone or in combination with other solvents such as pyridine. Room temperature and slightly elevated temperatures are suitable for effecting the reaction which goes to completion quickly. The desired 5α-hydroxy-6β-acetoxy compound may be extracted with ether after the mixture is diluted with water. The product is isolated by evaporation of the solvent under reduced pressure. Examples of specific compounds which are produced from the corresponding 5α,6β-dihydroxy pregnanes listed above are 5α,6β,17α,21-tetrahydroxy-3,11,20 - triketo - pregnane-6,21-diacetate, 5α,6β,21-trihydroxy-3,11,20-triketo-pregnane-6,21-acetate and 5α,6β,17α-trihydroxy-3,11,20-triketo-pregnane-6-acetate.

The third step in the process comprises dehydrating 5α-hydroxy-6-acetoxy pregnanes such as described above with acetic anhydride to produce the corresponding 6β-acetoxy-Δ⁴-pregnenes. In addition, pregnanes used as starting materials that have a 17α-hydroxy group are converted during the dehydration to the 17α-acetoxy compounds. This reaction may be conveniently accomplished by contacting the 5α-hydroxy-6-acetoxy pregnane in acetic anhydride and refluxing the mixture for a short time. Ordinarily one-half to 2 hours will suffice. The desired Δ⁴-pregnene is obtained from the reaction mixture by the usual procedures. Thus, the mixture may be taken up in ethyl acetate, washed with water, saturated sodium bicarbonate and again with water. The solvent may then be removed and the residue chromatographed over alumina to separate the product. In a specific illustration of this process 5α,6β,17α,21-tetrahydroxy-3,11,20-triketo-pregnane-6,21-diacetate is treated with acetic anhydride to give 6β,17α,21-trihydroxy-3,11,20-triketo - Δ⁴ - pregnene - 6,17,21 - triacetate. In the same manner, but using the appropriate precursors, 6β,21-dihydroxy-3,11,20 - triketo - Δ⁴ - pregnene - 6,21 - diacetate, 6β,17α-dihydroxy - 3,11,20 - triketo - Δ⁴ - pregnene - 6,17-diacetate and similar compounds are produced.

The 6β-acetoxy-Δ⁴-pregnenes of the prior step are converted to the corresponding free hydroxy compounds by treatment with a base. Bases such as sodium hydroxide, sodium carbonate and the like can be used for the saponification. To achieve this conversion it is ordinarily preferred to dissolve the pregnene in a suitable solvent such as methanol and treat the methanolic solution with an aqueous solution of a base for about a half-hour. Then sufficient acid is added to neutralize the reaction mixture. Recovery of the product is achieved in the usual ways such as by evaporation of the solvents, taking the residue up in ethyl acetate and evaporating to dryness. A specific illustration of this reaction comprises saponifying 6β,17α,21-trihydroxy-3,11,20 - triketo - Δ⁴ - pregnene-6,17,21-triacetate with sodium hydroxide to produce 6β,17α,21-trihydroxy-3,11,20-triketo-Δ⁴-pregnene. In the same manner 6β,21-dihydroxy-3,11-20-triketo - Δ⁴ - pregnene-6,21-diacetate and 6β,17α-dihydroxy-3,11,20-triketo-Δ⁴-pregnene-6,17-diacetate are converted to 6β,21-dihydroxy-3,11,20 - triketo - Δ⁴ - pregnene and 6β,17α-dihydroxy-3,11,20-triketo-Δ⁴-pregnene.

In the above described processes the intermediate compounds, which contain a 21-ester grouping, may be saponified to the corresponding 21-hydroxy compounds. When these intermediate esters contain additional ester groupings such as at positions 6 and 17 these groups are also saponified to the corresponding free hydroxyl groups.

According to a further embodiment of the present invention the novel 6β-hydroxy-3,11,20-triketo-Δ⁴-pregnene compounds having an α-hydrogen or α-hydroxy group in the 17 position and a methyl, methylol or esterified methylol group in the 21-position, at least one of the groups in the 17 and 21 positions containing oxygen, (VI), produced as described above, are converted to the corresponding 11β-hydroxy compounds. This conversion is achieved by first preparing the 3,20-bis-semicarbazone of the 3-keto-Δ⁴-pregnenes (X), reacting the said 3,20-bis-semicarbazones with an alkali metal borohydride to produce the corresponding 11β-hydroxy-Δ⁴-pregnene - 3,20 - bis - semicarbazones (XI) and subsequently hydrolyzing the 3,20-bis-semicarbazones to produce the desired 6β,11β-dihydroxy-3,20-diketo-Δ⁴-pregnenes having groups in the 17 and 21 positions as indicated above (XII). This process may be represented as follows:

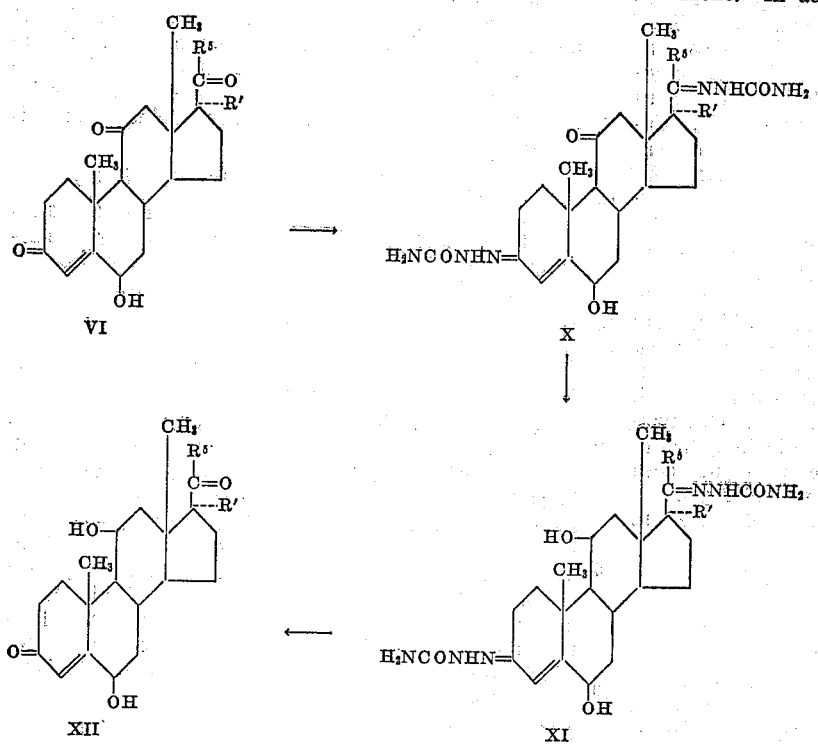

wherein R' is hydrogen or hydroxy and R⁵ is methyl, methylol or an esterified methylol group such as the acetate, propionate, butyrate and benzoate esters.

Preparation of the 3,20-bis-semicarbazones of compounds having the indicated formulas, such as 6β,17α, 21-trihydroxy - 3,11,20 - triketo - Δ⁴ - pregnene and 21-esters thereof, is conveniently achieved by treating such compounds with a semicarbazide, preferably in the form of a salt such as the acetate. This reaction is readily effected at ordinary temperatures in the presence of a suitable solvent such as a lower alcohol. At room temperature the reaction is usually completed in about 1–2 hours although longer reaction times have no adverse effects and often promote highest yields. The 3,20-bis-semicarbazones produced by this reaction such as 6β,17α,21-trihydroxy-3,11,20-triketo-Δ⁴ - pregnene - 3,20 - bis-semicarbazone may be recovered from the reaction mixture by extraction with a suitable organic solvent such as ethyl acetate. Other similar compounds produced in this manner that might be mentioned are 6β,21-dihydroxy-3,11,20-triketo-Δ⁴ - pregnene - 3,20 - bis - semicarbazone, 6β,17α-dihydroxy-3,11,20-triketo-Δ⁴-pregnene - 3,20 - bis-semicarbazone.

The 3,20-bis-semicarbazones obtained in the previous reaction can be converted to the corresponding 11β-hydroxy compounds by reduction of the 11-keto group. This reduction is conveniently effected by the use of a suitable alkali metal borohydride such as sodium borohydride, potassium borohydride or lithium borohydride. Generally, the desired reduction can be achieved by contacting the 3,20-bis-semicarbazone having an 11-keto group with an alkali metal borohydride in the presence of water or some other suitable medium such as methanol or tetrahydrofuran. After the reactants have been combined the mixture is heated at an elevated temperature, preferably about 75°–100° C. for an hour to complete the reaction. Upon cooling the reaction mixture the desired 11β-hydroxy-3,20-bis-semicarbazone may be recovered by extraction with a suitable solvent such as ethyl acetate. By applying this reduction method to 6β,17α,21 - trihydroxy - 3,11,20-triketo-Δ⁴-pregnene-3, 20-bis-semicarbazone there is produced 6β,11β,17α,21- tetrahydroxy-3,20-diketo-Δ⁴-pregnene - 3,20 - bis - semicarbazone. In addition, other compounds such as 6β, 11β,21-trihydroxy-3,20-diketo-Δ⁴ - pregnene - 3,20-bis-semicarbazone and 6β,11β,17α-trihydroxy-3,20-diketo-Δ⁴-pregnene-3,20-bis-semicarbazone are produced by this method. Furthermore this method is also useful for converting 11-keto-21-esters of such compounds to the corresponding 11β-hydroxy-21-esters, some esters which might be mentioned being the acetate, propionate and benzoate.

In the last step in this procedure the 11β-hydroxy-3,20-bis-semicarbazones are hydrolyzed to the corresponding 3,20-diketo compounds. This hydrolysis is accomplished by contacting the 11β-hydroxy-3,20-bis-semicarbazones in the presence of aqueous acid, such as 30–50% acetic acid or 30–50% formic acid, preferably together with a carbonyl acceptor such as pyruvic acid or benzoylformic acid. Room temperature is suitable for effecting the reaction which is completed in about 5–15 hours although extended contact does no noticeable harm. After completion of the reaction the mixture is neutralized and the product is extracted with a suitable organic solvent. Starting with 6β,11β,17α,21-tetrahydroxy-3,20-diketo-Δ⁴-pregnene - 3,20 - bis-semicarbazone, or the 21-acetate, propionate, benzoate and the like in this step there is obtained 6β,11β,17α,21-tetrahydroxy-3, 20-diketo-Δ⁴-pregnene or the 21-acetate, propionate, benzoate and the like thereof. Examples of other compounds obtained from the appropriate precursors by this reaction are 6β,11β,21 - trihydroxy - 3,20-diketo-Δ⁴-pregnene and 21-esters thereof as indicated herein, and 6β, 11β,17α-trihydroxy-3,20-diketo-Δ⁴-pregnene.

According to a further embodiment of this invention novel compositions for use in the treatment of appropriate diseases such as rheumatoid arthritis and various dermatoses are provided in which the active ingredient is 6β,17α,21-trihydroxy-3,11,20-triketo-Δ⁴-pregnene or a 21-ester thereof, 6β,11β,17α,21 - trihydroxy - 3,20-triketo-Δ⁴-pregnene or a 21-ester thereof, or one of the other novel 6β-hydroxy compounds such as described hereinabove. These compositions comprise at least one of the active compounds intimately united with a suitable carrier which can be either a liquid or a solid. The resulting compositions may take the form of tablets, powders, capsules, or other dosage forms as desired. Liquid diluents such as sterile water can be used to prepare compositions suitable for parenteral injection. In addition to the active ingredient and water, such compositions can contain suspending agents such as sodium carboxylmethyl cellulose, methylcellulose, gelatin and various solubilizers or dispersing agents such as lecithin. Sodium chloride may be added to make isotonic suspensions and benzyl alcohol can be used as a bacterostatic agent in liquid compositions. Solid preparations suitable for topical and oral administration are produced by dispersing the active ingredient in a solid carrier such as starch, sugar, talc and the like. The resulting composition can be employed as a powder or it can be used to fill capsules. In addition such solid compositions may be tableted if desired by the application of well known tableting techniques. The concentration of active ingredient in such compositions, whether liquid or solid, may be adjusted to suit any intended purpose. One typical tablet could have the composition: 6$\beta$-hydroxy hydrocortisone-21-acetate, .025 gm.; lactose, 0.20 gm.; corn starch, 0.07 gm.; and magnesium stearate, 0.003 gm.

The following examples are added to illustrate but not to limit the invention.

EXAMPLE 1

3-ethylenedioxy-17$\alpha$,21-dihydroxy-11,20-diketo-5,6-epoxypregnane-21-acetate 3.4 g. of 3-ethylenedioxy-17$\alpha$,21 - dihydroxy-11,20-diketo-$\Delta^5$-pregnene-21-acetate is added to 120 ml. of dimethylformamide and 85 ml. of chloroform with warming to aid dissolution. The mixture is cooled to room temperature and treated with monoperphthalic acid in benzene (37 ml. of 0.44 molar solution). After standing at room temperature for 24 hours the mixture is cooled and filtered. The 3-ethylenedioxy-17$\alpha$,21-dihydroxy-11,20-diketo - 5,6 - epoxypregnane - 21 - acetate is washed with ether and air dried. It is refluxed in methanol to remove dimethylformamide; M.P. 318–320° C.

This reaction is repeated starting with 3-ethylene-dioxy-21-hydroxy - 11,20 - diketo - $\Delta^5$-pregnene-21-acetate to produce the corresponding 5,6-epoxypregnane thereof.

EXAMPLE 2

5$\alpha$,6$\beta$,17$\alpha$,21-tetrahydroxy-3,11,20-triketo-pregnane-6-formate-21-acetate About 200 mg. of 3-ethylenedioxy-17$\alpha$,21-dihydroxy-11,20-diketo-5,6-epoxypregnane-21-acetate is added to 1.5 ml. of 98% formic acid. After standing about 10 minutes at room temperature the reaction mixture is diluted with water and extracted with ethyl acetate. The organic extract is washed with water, dried over sodium sulfate and the solvent removed under reduced pressure. After the resulting 5$\alpha$,6$\beta$,17$\alpha$,21-tetrahydroxy-3,11,20-triketo-pregnane-6-formate-21-acetate is recrystallized from chloroform-ethyl ether it melts at 217–219° C.

By following this procedure employing compounds such as 3-ethylenedioxy-21-hydroxy-11,20-diketo 5,6-epoxypregnane-21-acetate and other 21-esters thereof such as the propionate, hemisuccinate, benzoate, t-butylacetate and tricarballylate there is obtained a 5$\alpha$,6$\beta$,21-trihydroxy - 3,11,20 - triketo - pregnane - 6 - formate-21-acetate and other esters thereof as listed above.

EXAMPLE 3

6$\beta$,17$\alpha$,21 - trihydroxy - 3,11,20 - triketo - $\Delta^4$ - pregnene-6-formate-21-acetate To 1.5 ml. of 98% formic acid is added 100 mg. of 5$\alpha$,6$\beta$,17$\alpha$ - 21 - tetrahydroxy - 3,11,20 - triketo - pregnane-6-formate-21-acetate with shaking. The solution is heated on the steam bath for 25 minutes, cooled, diluted with water and extracted with chloroform. The chloroform extract is neutralized with dilute sodium bicarbonate and dried over anhydrous sodium sulfate. The chloroform is evaporated to a small volume (ca. 2 ml.) and then ether is added to the mixture. The mixture is refluxed, cooled and the crystalline 6$\beta$,17$\alpha$,21-trihydroxy - 3,11,20 - triketo - $\Delta^4$ - pregnene - 6 - formate-21-acetate isolated by filtration. The melting point is 206–208° C.; $\lambda$ max.=2280 A.

(E%, 336); $[\alpha]_D^{27}$ +156° (C=1, CHCl$_3$)

The procedure described above is applied to 5$\alpha$,6$\beta$-21-trihydroxy - 3,11,20 - triketo - pregnane - 6 - formate-21-acetate to obtain 6$\beta$,21-dihydroxy-3,11,20-triketo-$\Delta^4$-pregnene-6-formate-21-acetate.

EXAMPLE 4

6$\beta$,17$\alpha$,21 - trihydroxy - 3,11,20 - triketo - $\Delta^4$ - pregnene-21-acetate To a solution of 50 mg. of 6$\beta$,17$\alpha$,21-trihydroxy-3,11,20-triketo-$\Delta^4$-pregnene-6-formate-21-acetate in 2 ml. of methanol is added 1 ml. of 5% potassium bicarbonate in 50% aqueous methanol. The mixture is allowed to stand at room temperature for 15 minutes, poured into water and extracted with chloroform. The chloroform extract is washed with water, dried over anhydrous sodium sulfate and evaporated to about 0.5 ml. Ether is added to crystallize the product. After recrystallization from acetone-ether the 6$\beta$,17$\alpha$,21-trihydroxy-3,11,20-triketo-$\Delta^4$-pregnene-21-acetate decomposes at 245–248° C.; $\lambda$ max. 2320 A.

(E%=314, E mol. 13, 150; $[\alpha]_D^{27}$ +128 (C=1, CHCl$_3$)

Starting with 6$\beta$,21-dihydroxy-3,11,20-triketo-$\Delta^4$-pregnene-6-formate-21-acetate this compound is hydrolyzed according to this method to give 6$\beta$,21-dihydroxy-3,11,20-triketo-$\Delta^4$-pregnene-21-acetate.

EXAMPLE 5

6$\beta$,17$\alpha$,21 - trihydroxy - 3,11,20 - triketo - $\Delta^4$ - pregnene-(6$\beta$-hydroxy cortisone)

A solution of 100 mg. of 6$\beta$,17$\alpha$,21-trihydroxy-3,11,20-triketo-$\Delta^4$-pregnene-21-acetate in 15 ml. of methanol is combined with 20 ml. of 10% aqueous sodium hydroxide under nitrogen. After standing for about an hour glacial acetic acid is added to the mixture and the methanol is then removed under reduced pressure. The aqueous solution is extracted with ethyl acetate and the extract is washed with water and is dried over anhydrous magnesium sulfate. The solution is concentrated to a small volume and cooled to yield crystals of substantially pure 6$\beta$,17$\alpha$,21-trihydroxy-3,11,20-triketo-$\Delta^4$-pregnene; M. P. 222–223° C.

In addition to this compound the procedure of this example is used to prepare 6$\beta$,21-dihydroxy-3,11,20-triketo-$\Delta^4$-pregnene from 6$\beta$,21-dihydroxy-3,11,20-triketo-$\Delta^4$-pregnene-21-acetate and other esters thereof such as the propionate, butyrate, t-butyl acetate, benzoate, tricarballylate, hemisuccinate and the like.

EXAMPLE 6

6$\beta$,17$\alpha$,21 - trihydroxy - 3,11,20 - triketo-$\Delta^4$ - pregnene (6$\beta$-hydroxy cortisone)

A solution of 1 g. of potassium bicarbonate in 5 ml. of methanol and 15 ml. of water is placed in a flask and the flask is evacuated and purged with nitrogen. To this solution is added with stirring under nitrogen 100 mg. of 6$\beta$,17$\alpha$,21 - trihydroxy - 3,11,20 - triketo - $\Delta^4$ - pregnene-6-formate-21-acetate. After stirring for 2 hours a solution of 4 g. of sodium dihydrogen phosphate in 20 ml. of water is added dropwise to the reaction mixture. Methanol is removed under reduced pressure and the aqueous residue is extracted with ethyl acetate. The ethyl acetate is washed with water and removed under reduced pressure. The resulting 6$\beta$,17$\alpha$,21-trihydroxy-3,11,20-triketo- Δ⁴-pregnene is recrystallized from ethyl acetate and then acetone-ether to give the pure product melting at 222–223° C.

Using the described conditions but employing 6β,21-dihydroxy-3,11,20-triketo-Δ⁴-pregnene-6-formate-21-acetate as the starting material there is produced 6β,21-dihydroxy-3,11,20-triketo-Δ⁴-pregnene.

EXAMPLE 7

*6β,17α,21 - trihydroxy - 3,11,20 - triketo - Δ⁴ - pregnene-6-formate-21-acetate*

To 1.5 ml. of 98% formic acid is added 100 mg. of 3-ethylenedioxy-17α,21-dihydroxy-11,20-diketo-5,6-epoxy-pregnane-21-acetate. The mixture is shaken at room temperature until solution is effected. The mixture is then warmed on the steam bath for one-half hour. The mixture is cooled, diluted with water and extracted with chloroform. The chloroform extract is neutralized with aqueous sodium bicarbonate, dried over anhydrous sodium sulfate and the chloroform reduced to a small volume under reduced pressure. Ether is added to precipitate the 6β,17α,21-trihydroxy-3,11,20-triketo-Δ⁴-pregnene-6-formate-21-acetate. It melts at 206–208° C.

This reaction is repeated using 3-ethylenedioxy-21-hydroxy-11,20-diketo-5,6-epoxypregnane-21-acetate and 3-ethylenedioxy-17α-hydroxy-11,20-diketo-5,6-epoxypregnane to produce 6β,21-dihydroxy-3,11,20-triketo-Δ⁴-pregnene-6-formate-21-acetate and 6β,17α-dihydroxy-3,11,20-triketo-Δ⁴-pregnene-6-formate.

EXAMPLE 8

*5α,6β,17α,21 - tetrahydroxy - 3,11,20 - triketopregnane-21-acetate*

To 150 mg. of 3-ethylenedioxy-17α,21-dihydroxy-11,20-diketo-5,6-epoxypregnane-21-acetate in 15 ml. of acetone is added 2.2 ml. of a solution of 3 parts of concentrated sulfuric acid to 1 part of water in 400 parts of acetone. The mixture is refluxed until solution is effected. The solution is neutralized with pyridine and the solvents removed under reduced pressure. The residue is dissolved in ethyl acetate, the ethyl acetate is washed with water, dried over anhydrous sodium sulfate and concentrated. The mixture is cooled to precipitate crystalline 5α,6β,17α,21-tetrahydroxy-3,11,20-triketopregnane-21-acetate; M. P. 269–270° C.

EXAMPLE 9

*5α,6β,17α,21-tetrahydroxy-3,11,20-triketo-pregnane-6,21-diacetate*

800 mg. of 5α,6β,17α,21-tetrahydroxy-3,11,20-triketo pregnane-21 acetate is added to 2 ml. of acetic anhydride and 2 ml. of pyridine. The mixture is warmed on the steam bath, cooled, diluted with water and extracted with ether. The ether extract is washed, dried over anhydrous sodium sulfate and chromatographed over acid-washed alumina to give 5α,6β,17α,21-tetrahydroxy-3,11,20-triketo pregnane-6,21-diacetate.

EXAMPLE 10

*6β,17α,21-trihydroxy-3,11,20-triketo-Δ⁴-pregnene-6,17,21-triacetate*

About 400 mg. of 5α,6β,17α,21-tetrahydroxy-3,11,20-triketo-pregnane-6,21-diacetate is refluxed in acetic anhydride for an hour. The mixture is added to ethyl acetate, washed with water, saturated aqueous sodium bicarbonate and water. The organic layer is dried over anhydrous sodium sulfate and the solvent is removed under reduced pressure. Chromatography over acid-washed alumina gives 6β,17α,21-trihydroxy-3,11,20-triketo-Δ⁴-pregnene-6,17,21-triacetate in the ethyl acetate-ether (1:1) fraction. After recrystallization from ethyl acetate it melts at 225.5–227° C.; [α]_D^{24.5}+56° (acetone); max. λ 2310A., E mol.=12,600.

EXAMPLE 11

*6β,17α,21-trihydroxy-3,11,20-triketo-Δ⁴-pregnene (6β-hydroxy cortisone)*

97 mg. of 6β,17α,21-trihydroxy-3,11,20-triketo-Δ⁴-pregnene-6,17,21-triacetate in 10 ml. of methanol is treated with 10% aqueous sodium hydroxide under nitrogen. After standing 30 minutes at room temperature the reaction mixture is treated with glacial acetic acid and the solvents are removed under reduced pressure. The residue is taken up in ethyl acetate, washed with water, dried over anhydrous sodium sulfate and the solvent removed under reduced pressure. The product is triturated with ether to give purified 6β,17α,21-trihydroxy-3,11,20-triketo-Δ⁴-pregnene; λ max. 2310 A.; E, mol.=11,290.

EXAMPLE 12

*6β,17α,21-trihydroxy-3,11,20-triketo-Δ⁴-pregnene-3,20-bis-semicarbazone*

To a solution of 400 mg. of 6β,17α,21-trihydroxy-3,11,20-triketo-Δ⁴-pregnene in 10 ml. of methanol is added 700 mg. of semicarbazide acetate in 30 ml. of methanol. The mixture is stirred at room temperature over-night and diluted with water. The precipitated 6β,17α,21-trihydroxy-3,11,20-triketo-Δ⁴-pregnene-3,20-bis-semicarbazone is filtered, washed with water and dried.

EXAMPLE 13

*6β,11β,17α,21-tetrahydroxy-3,20-diketo-Δ⁴-pregnene-3,20-bis-semicarbazone*

In a suspension of 550 mg. of 6β,17α,21-trihydroxy-3,11,20-triketo-Δ⁴-pregnene-3,20-bis-semicarbazone in 25 ml. of water is dissolved 300 mg. of sodium borohydride. The mixture is heated at 100° C. for one hour, cooled and extracted with ethyl acetate. The ethyl acetate solution is washed with water, dried and concentrated to yield the desired 6β,11β,17α,21,tetrahydroxy-3,20-diketo-Δ⁴-pregnene-3,20-bis-semicarbazone.

EXAMPLE 14

*6β,11β,17α,21-tetrahydroxy-3,20-diketo-Δ⁴-pregnene (6β-hydroxy hydrocortisone)*

A mixture of 360 mg. of 6β,11β,17α,21-tetrahydroxy-3,20-diketo-Δ⁴-pregnene-3,20-bis-semicarbazone in 10 ml. of 50% acetic acid containing 0.24 ml. of pyruvic acid is stirred under nitrogen at room temperature for 24 hours. Solid sodium bicarbonate is then added until the reaction mixture is neutral. Water is added and the solution is extracted with ethyl acetate. The extract is dried and concentrated to give 6β,11β,17α,21-tetrahydroxy-3,20-diketo-Δ⁴-pregnene.

EXAMPLE 15

*3-ethylenedioxy-17α-hydroxy-11,20-diketo-5,6-epoxypregnane*

2.9 g. of 3-ethylenedioxy-17α-hydroxy-11,20-diketo-Δ⁵-pregnene is added to 105 ml. of dimethylformamide and 75 ml. of chloroform with warming to aid dissolution. The mixture is cooled to room temperature and treated with monoperphthalic acid in benzene (33 ml. of 0.44 molar solution). After standing at room temperature for 24 hours the mixture is cooled and filtered. The resulting 3-ethylenedioxy-17α-hydroxy-11,20-diketo-5,6-epoxypregnane is washed with ether and air dried.

EXAMPLE 16

*5α,6β,17α-trihydroxy-3,11,20-triketo-pregnane-6-formate*

About 170 mg. of 3-ethylenedioxy-17α-hydroxy-11,20-diketo-5,6-epoxypregnane is added to 1.3 ml. of 98% formic acid. After standing about 10 minutes at room temperature the reaction mixture is diluted with water and extracted with ethyl acetate. The organic extract is washed with water, dried over sodium sulfate and the solvent removed under reduced pressure to leave as a residue 5α,6β,17α-trihydroxy-3,11,20-triketo-pregnane-6-formate.

EXAMPLE 17

*6β,17α-dihydroxy-3,11,20-triketo-Δ⁴-pregnene-6-formate*

To 1.3 ml. of 98% formic acid is added 85 mg. of 5α,6β,17α - trihydroxy - 3,11,20 - triketo - pregnane - 6-formate with shaking. The solution is heated on the steam bath for 25 minutes, cooled, diluted with water and extracted with chloroform. The chloroform extract is neutralized with dilute sodium bicarbonate and dried over anhydrous sodium sulfate. The chloroform is evaporated to a small volume (ca. 2 ml.) and then ether is added to the mixture. The mixture is refluxed, cooled and the crystalline 6β,17α-dihydroxy-3,11-20-triketo-Δ⁴-pregnene-6-formate isolated by filtration.

EXAMPLE 18

*6β,17α-dihydroxy-3,11,20-triketo-Δ⁴-pregnene*

To a solution of 42 mg. of 6β,17α-dihydroxy-3,11,20-triketo-Δ⁴-pregnene-6-formate in 2 ml. of methanol is added 1 ml. of 5% potassium bicarbonate in 50% aqueous methanol. The mixture is allowed to stand at room temperature for about 15 minutes, poured into water and extracted with chloroform. The chloroform extract is washed with water, dried over anhydrous sodium sulfate and evaporated to about 0.5 ml. The product, 6β,17α-dihydroxy-3,11,20-triketo-Δ⁴-pregnene is crystallized by the addition of ether.

EXAMPLE 19

*3-ethylenedioxy-21-hydroxy-11,20-diketo-5,6-epoxy-pregnane-21-benzoate*

To 105 ml. of dimethylformamide and 75 ml. of chloroform is added 3.4 g. of 3-ethylenedioxy-21-hydroxy-11,20-diketo-Δ⁵-pregnene-21-benzoate with warming to effect solution. After cooling to room temperature 33 ml. of a 0.44 molar solution of monoperphthalic acid in benzene is added to the mixture. The mixture is held at room temperature overnight, then cooled and the product filtered. The 3-ethylenedioxy-21-hydroxy-11,20-diketo-5,6-epoxypregnane-21-benzoate is washed with ether and air dried.

In the same manner but starting with other 21-esters of 3 - ethylenedioxy-21-hydroxy-11,20-diketo-Δ⁵-pregnene such as the acetate, propionate, butyrate, valerate, isovalerate, hemisuccinate, t-butylacetate, phenylacetate and tricarballylate there is obtained the corresponding 21-esters of 3-ethylenedioxy-21-hydroxy - 11,20 - diketo-5,6-epoxypregnane such as 3-ethylenedioxy-21-hydroxy-11,20-diketo-5,6-epoxypregnane-21-acetate, 21-propionate, 21-butyrate, 21-valerate, 21-isovalerate, 21-hemisuccinate, 21-t-butylacetate, 21-phenylacetate, 21-tricarballylate and the like.

EXAMPLE 20

*5α,6β,21-trihydroxy-3,11,20-triketo-pregnane-6-formate-21-benzoate*

To 1.3 ml. of 98% formic acid is added 200 mg. of 3-ethylenedioxy-21-hydroxy-11,20-diketo-5,6 - epoxypregnane-21-benzoate. The mixture is left at room temperature for 15 minutes and diluted with water. The mixture is extracted with ethyl acetate and the organic extract is washed with water, and dried over magnesium sulfate. The solvent upon evaporation gives 5α,6β,21-trihydroxy-3,11,20-triketo-pregnane-6-formate-21-benzoate.

In a like manner but starting with other 21-esters of 3 - ethylenedioxy-21-hydroxy-11,20-diketo-5,6-epoxy pregnane as prepared in Example 19 and reacting them with formic acid there is produced 5α,6β,21-trihydroxy-3,11,20-triketo - pregnane-6-formate - 21 - acetate,5α,6β,21 - trihydroxy-3-11,20-triketo-pregnane-6-formate-21-valerate and other 21-esters thereof such as the propionate, butyrate, isovalerate, caproate, phenylacetate, t-butylacetate, hemisuccinate and tricarballylate.

EXAMPLE 21

*6β,21-dihydroxy-3,11,20-triketo-Δ⁴-pregnene-6-formate-21-benzoate*

About 150 mg. of 5α,6β,21-trihydroxy-3,11,20-triketo-pregnane-6-formate-21-benzoate is added to 2 ml. of 98% formic acid with stirring. The mixture is heated on the steam bath for 1 hour and then cooled to room temperature. It is extracted with chloroform, the organic extract is neutralized with dilute aqueous sodium bicarbonate and dried over anhydrous magnesium sulfate. The chloroform is evaporated to about 3 ml. and ether is added to the mixture. The desired 6β,21-dihydroxy-3,11,20-triketo-Δ⁴-pregnene-6-formate-21-benzoate is isolated by evaporating the solvents.

The procedures of this example are repeated starting with other 21-esters of 5α,6β,21-trihydroxy-3,11,20-triketo-pregnane-6-formate such as are described in Example 20 and there is obtained compounds such as 6β,21-dihydroxy - 3,11,20-triketo-Δ⁴-pregnene-6-formate-21-propionate and other corresponding 21-esters like the acetate, butyrate, hemisuccinate, t-butylacetate, valerate, isovalerate, tricarballylate, caproate and phenylacetate.

EXAMPLE 22

*6β,21-dihydroxy-3,11,20-triketo-Δ⁴-pregnene-21-benzoate*

To 100 mg. of 6β,21-dihydroxy-3,11,20-triketo-Δ⁴-pregnene-6-formate-21-benzoate in 4 ml. of methanol is added a 50% water-methanol solution containing 5% potassium bicarbonate. The mixture is held at room temperature for about 10 minutes and then is poured into water. The mixture is extracted with ethyl acetate and the organic extract is washed with water. It is dried over anhydrous magnesium sulfate and evaporated to 1 ml. Ether is added to crystallize 6β,21-dihydroxy-3,11-20-triketo-Δ⁴-pregnene-21-benzoate. The product is filtered and dried.

This procedure is followed starting with other 21-esters of 6β,21-dihydroxy-3,11,20-triketo-Δ⁴-pregnene-6-formate such as produced in Example 21 to produce 6β,21-dihydroxy-3,11,20-triketo-Δ⁴-pregnene-21-propionate and similar esters thereof and in particular the 21-acetate, butyrate, hemisuccinate, t-butylacetate, tricarballylate, valerate, isovalerate, caproate and phenylacetate.

EXAMPLE 23

*6β,21-dihydroxy-3,11,20-triketo-Δ⁴-pregnene*

A solution of 1 g. of potassium bicarbonate in 5 ml. of methanol and 15 ml. of water is placed in a flask and the flask is evacuated and purged with nitrogen. To this solution is added with stirring under nitrogen 100 mg. of 6β,21-dihydroxy-3,11,20-triketo-Δ⁴-pregnene-6-formate-21-acetate. After stirring for 2 hours a solution of 4 g. of sodium dihydrogen phosphate in 20 ml. of water is added dropwise to the reaction mixture. Methanol is removed under reduced pressure and the aqueous residue is extracted with ethyl acetate. The ethyl acetate is washed with water and removed under reduced pressure. The resulting 6β,21-dihydroxy-3,11,20-triketo-Δ⁴-pregnene is recrystallized from ethyl acetate and then acetone-ether to give the pure product melting at 222–223° C.

This reaction is repeated starting with 6β,21-dihydroxy-3,11,20-Δ⁴-pregnene-6-formate-21-benzoate and there is produced 6β,21-dihydroxy-3,11,20-triketo - Δ⁴ - pregnene. In the same manner the final product can be produced from similar starting materials having different 21-ester groups such as the acetate, propionate, butyrate, valerate, isovalerate, hemisuccinate, tricarballylate, t-butylacetate and phenylacetate.

Various changes and modifications of the invention can be made and to the extent that such variations incorporate the spirit of this invention they are intended to be included within the scope of the appended claims.

What is claimed is:

1. The process which comprises reacting a compound of the formula

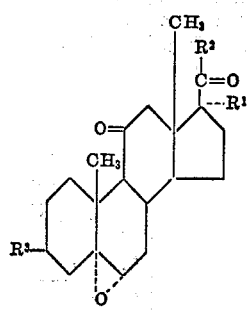

wherein $R^1$ is a member of the group consisting of hydrogen and hydroxy, $R^2$ is a member of the group consisting of methyl and esterified methylol groups, at least one substituent represented by $R^1$ and $R^2$ being an oxygen containing group and $R^3$ is a group convertible to keto by hydrolysis, with formic acid at about room temperature to produce a compound of the formula

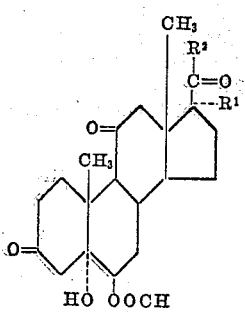

wherein $R^1$ and $R^2$ have the previously assigned significance.

2. The process which comprises reacting 3-ethylenedioxy-17α, 21-dihydroxy-11,20-diketo-5,6-epoxy-pregnane-21-acetate with formic acid at about room temperature to produce 5α, 6β, 17α, 21-tetrahydroxy-3,11,20-triketo-pregnane-6-formate-21-acetate.

3. 5α,6β-dihydroxy-3,11,20-triketo-pregnane - 6 - formate having in the 17 position a substituent of the group consisting of α-hydrogen and α-hydroxy and in the 21-position a member of the group consisting of methyl and esterified methylol groups, at least one substituent in the 17 and 21 positions being an oxygen containing group.

4. 5α, 6β, 7α, 21-tetrahydroxy-3,11,20-triketo-pregnane-6-formate-21-acetate.

5. 5α, 6β, 21-trihydroxy-3,11,20-triketo-pregnane-6-formate-21-acetate.

6. 5α, 6β, 17α-trihydroxy-3,11,20-triketo-pregnane-6-formate.

7. The process which comprises reacting a compound of the formula

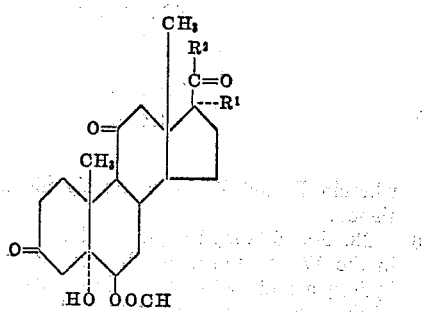

wherein $R^1$ is a member of the group consisting of hydrogen and hydroxy and $R^2$ is a member of the group consisting of methyl and esterified methylol groups at least one substituent represented by $R^1$ and $R^2$ being an oxygen containing group, with formic acid at an elevated temperature to produce a compound of the formula

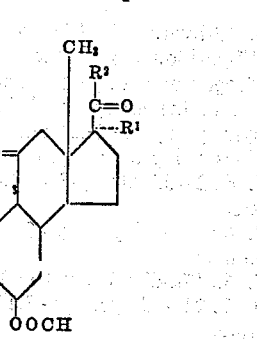

wherein $R^1$ and $R^2$ have the significance previously assigned.

8. The process which comprises reacting 5α,6β,17α,21-tetrahydroxy-3,11,20-triketo-pregnane-6-formate - 21-acetate with formic acid at an elevated temperature to produce 6β,17α,21-trihydroxy-3,11,20-triketo-Δ⁴-pregnene-6-formate-21-acetate.

9. 6β-hydroxy-3,11,20-triketo-Δ⁴-pregnane-6 - formate having in the 17-position a substituent of the group consisting of α-hydrogen and α-hydroxy and in the 21-position a member of the group consisting of methyl and esterified methylol groups, at least one substituent in the 17 and 21 positions being an oxygen containing group.

10. 6β,17α,21-trihydroxy - 3,11,20-triketo-Δ⁴-pregnene-6-formate-21-acetate.

11. 6β,21-dihydroxy-3,11,20 - triketo - Δ⁴-pregnene-6-formate-21-acetate.

12. 6β,17α-dihydroxy-3,11,20 - triketo - Δ⁴-pregnane-6-formate.

13. The process which comprises selectively hydrolyzing a compound of the formula

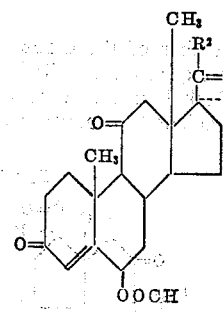

wherein $R^1$ is a member of the group consisting of hydrogen and hydroxy and $R^2$ is a member of the group consisting of methyl and esterified methylol groups at least one substituent represented by $R^1$ and $R^2$ being an oxygen containing group, with a dilute solution of a base to produce a compound of the formula

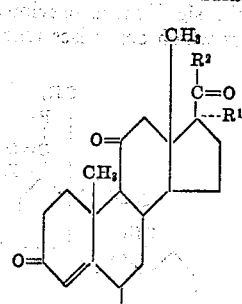

wherein $R^1$ and $R^2$ have the significance previously assigned.

14. The process which comprises selectively hydrolyzing 6β,21-dihydroxy-3,11,20-triketo - Δ⁴-pregnene-6-formate-21-acetate with a dilute solution of a base to produce 6β,21-dihydroxy-3,11,20-triketo-Δ⁴-pregnene-21-acetate.

15. 6β-hydroxy-3,11,20-triketo-Δ⁴-pregnene having in the 17-position a substituent of the group consisting of α-hydrogen and α-hydroxy and in the 21-position a substituent of the group consisting of methyl and esterified methylol groups, at least one substituent in the 17 and 21 positions being an oxygen containing group.

16. 6β,21-dihydroxy-3,11,20-triketo-Δ⁴ - pregnene - 21-acetate.

17. 6β,21 - dihydroxy - 3,11,20-triketo-Δ⁴-pregnene-21-propionate.

18. 6β,17α-dihydroxy-3,11,20-triketo-Δ⁴-pregnene.

19. 6β,21 - dihydroxy - 3,11,20-triketo-Δ⁴-pregnene-21-butyrate.

20. 6β,21 - dihydroxy - 3,11,20-triketo-Δ⁴-pregnene-21-tricarballylate.

21. 6β,21 - dihydroxy - 3,11,20-triketo-Δ⁴-pregnene-21-t-butylacetate.

22. 6β,21 - dihydroxy - 3,11,20-triketo-Δ⁴-pregnene-21-benzoate.

23. 6β,21 - dihydroxy - 3,11,20-triketo-Δ⁴-pregnene-21-hemisuccinate.

24. The process which comprises reacting a compound of the formula

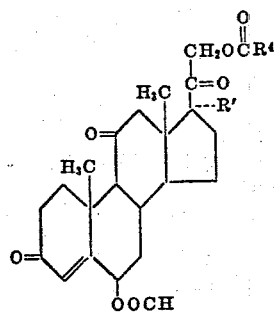

wherein R' is a member of the group consisting of hydrogen and the hydroxy group and R⁴ is a member of the group consisting of alkyl, aryl, and aralkyl groups, with a base for a time sufficient to produce a compound of the formula

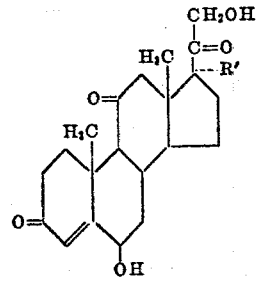

wherein R' has the significance previously assigned.

25. The process which comprises reacting a compound of the formula

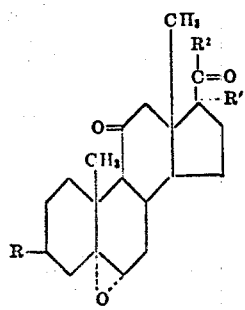

wherein R' is a member of the group consisting of hydrogen and hydroxy, R² is a member of the group consisting of methyl and esterified methylol groups, at least one substituent represented by R' and R² being an oxygen containing group, and R³ is a group convertible to keto by hydrolysis, with formic acid at an elevated temperature to produce a compound of the formula

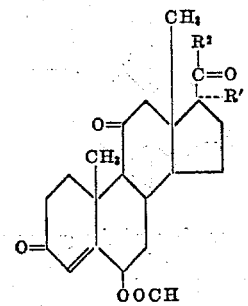

wherein R' and R² have the significance previously assigned.

26. The process which comprises reacting 3-ethylenedioxy-17α,21-dihydroxy - 11,20-diketo-5,6-epoxypregnane-21-acetate with formic acid at an elevated temperature to produce 6β,17α,21-trihydroxy-3,11,20-triketo-Δ⁴-pregnene-6-formate-21-acetate.

27. The process which comprises reacting a compound of the formula

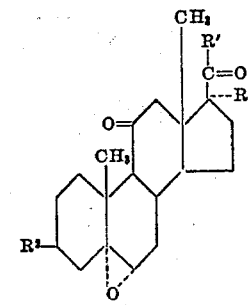

wherein R is a member of the group consisting of hydrogen and hydroxy, R' is a member of the group consisting of methyl and esterified methylol groups, at least one substituent represented by R and R' being an oxygen containing group and R² is a group convertible to keto by keto by hydrolysis, with an acid to form a compound of the formula

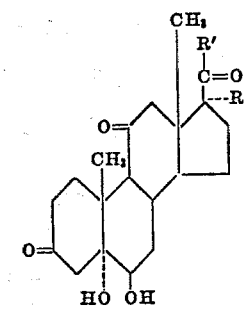

wherein R and R' have the significance previously assigned.

28. 5α, 6β-dihydroxy-3,11,20-triketo-pregnane having in the 17 position a member of the group consisting of hydrogen and hydroxy and in the 21 position a member of the group consisting of methyl and esterified methylol groups, at least one substituent in the 17 and 21 positions being an oxygen containing group.

29. 5α,6β,17α,21-tetrahydroxy-3,11,20,-triketo-pregnane-21-acetate.

30. The process which comprises reacting a compound of the formula

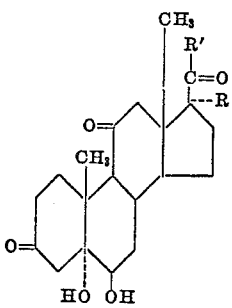

wherein R is a member of the group consisting of hydrogen and hydroxy and R' is a member of the group consisting of methyl and esterified methylol groups, at least one of the substituents represented by R and R' being an oxygen containing group, with a source of the acetate radical at about room temperature to produce a compound of the formula

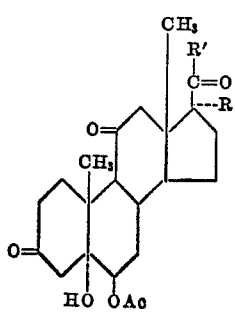

wherein R and R' have the significance previously assigned.

31. 5α,6β-dihydroxy-3,11,20-triketo-pregnane-6-acetate having in the 17 position a member of the group consisting of hydrogen and hydroxy and in the 21 position a member of the group consisting of methyl and esterified methylol groups, at least one substituent in the 17 and 21 positions being an oxygen containing group.

32. 5β,6α,17α,21-tetrahydroxy-3,11,20-triketo-pregnane-6,21-diacetate.

33. 6β-hydroxy-3,11,20-triketo-Δ⁴-pregnene-6-acetate having in the 17 position a member of the group consisting of hydrogen and acetate and in the 21 position a member of the group consisting of methyl and esterified methylol groups, at least one substituent in the 17 and 21 positions being an oxygen containing group.

34. 6β,17α,21-trihydroxy-3,11,20-triketo-Δ⁴-pregnene-6,17,21-triacetate.

35. 6β,11β,17α-trihydroxy-3,20-diketo-Δ⁴-pregnene having in the 21-position a member of the group consisting of methyl, methylol and

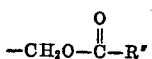

wherein R'' is a hydrocarbon group containing less than nine carbon atoms.

36. 6β,11β,17α,21-tetrahydroxy-3,20-diketo-Δ⁴-pregnene-21-acetate.

37. 6β,11β,17α-trihydroxy-3,20-diketo-Δ⁴-pregnene.

38. Δ⁴-pregnene-6β,11β,17α,21-tetrol-3,20-dione of the formula

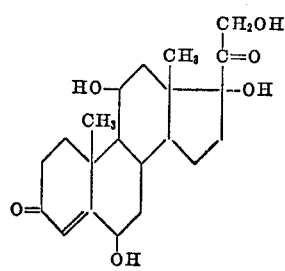

39. 6β,21-dihydroxy-4-pregnene-3,11,20-trione of the formula

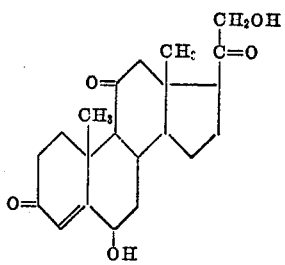

40. 6β,17α,21-trihydroxy-3,11,20-triketo-Δ⁴-pregnene.

41. 6β,17α,21-trihydroxy-3,11,20-triketo-Δ⁴-pregnene 21-acetate.

42. The process which comprises reacting 6β,17α,21-trihydroxy-3,11,20-triketo-Δ⁴-pregnene-6-formate-21-acetate with a base to produce 6β,17α,21-trihydroxy-3,11,20-triketo-Δ⁴-pregnene.

43. A process for selectively hydrolyzing 6β,17α,21-trihydroxy-3,11,20-triketo-Δ⁴-pregnene-6-formate-21-acetate to produce 6β,17α,21-trihydroxy-3,11,20-triketo-Δ⁴-pregnene-21-acetate which comprises reacting the formate with a dilute solution of a base.

44. A Δ⁴-pregnene-6,17α,21-triol-3,11,20-trione of the formula

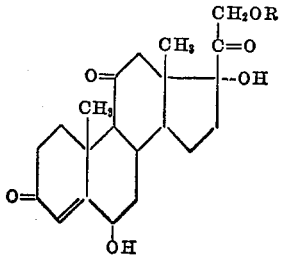

wherein R is a member of the group consisting of hydrogen and acetyl.

References Cited in the file of this patent
UNITED STATES PATENTS

| | | |
|---|---|---|
| 2,142,170 | Bockmuhl | Jan. 3, 1939 |
| 2,312,344 | Logemann | Mar. 2, 1943 |
| 2,670,357 | Murray | Feb. 23, 1954 |
| 2,672,466 | Murray | Mar. 16, 1954 |
| 2,672,467 | Hanze | Mar. 16, 1954 |
| 2,672,468 | Ogilvie | Mar. 16, 1954 |
| 2,787,624 | Fieser | Apr. 2, 1957 |

OTHER REFERENCES

Oliveto et al.: J.A.C.S. 75, January 20, 1953, page 487.

UNITED STATES PATENT OFFICE
CERTIFICATE OF CORRECTION

Patent No. 2,905,678                                         September 22, 1959

Lewis H. Sarett et al.

It is hereby certified that error appears in the printed specification of the above numbered patent requiring correction and that the said Letters Patent should read as corrected below.

Column 18, lines 27 and 37, for "-pregnane-6-", each occurrence, read -- -pregnene-6- --; column 20, lines 50 and 51, strike out "by keto"; column 21, line 47, for "$5\beta,6\alpha$," read -- $5\alpha,6\beta$, --.

Signed and sealed this 3rd day of May 1960.

(SEAL)
Attest:

KARL H. AXLINE
Attesting Officer

ROBERT C. WATSON
Commissioner of Patents